US011590831B2

(12) United States Patent
Zedler et al.

(10) Patent No.: US 11,590,831 B2
(45) Date of Patent: Feb. 28, 2023

(54) DEVICE AND METHOD FOR CONTROLLING A SHADING SYSTEM FOR A VEHICLE

(71) Applicant: DAIMLER AG, Stuttgart (DE)

(72) Inventors: Manja Zedler, Rudolstadt (DE); Tingting Zhang-Xu, Sindelfingen (DE); Thomas Kälberer, Weil der Stadt (DE); Fabian Stiebert, Horb (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 17/632,076

(22) PCT Filed: Jul. 15, 2020

(86) PCT No.: PCT/EP2020/069931
§ 371 (c)(1),
(2) Date: Feb. 1, 2022

(87) PCT Pub. No.: WO2021/023486
PCT Pub. Date: Feb. 11, 2021

(65) Prior Publication Data
US 2022/0274471 A1 Sep. 1, 2022

(30) Foreign Application Priority Data
Aug. 2, 2019 (DE) ...................... 10 2019 005 447.4

(51) Int. Cl.
B60J 3/04 (2006.01)
B60N 2/874 (2018.01)
(Continued)

(52) U.S. Cl.
CPC ................ B60J 3/04 (2013.01); B60N 2/874 (2018.02); G06V 20/593 (2022.01); G06V 20/597 (2022.01); B60J 1/2019 (2013.01)

(58) Field of Classification Search
None
See application file for complete search history.

(56) References Cited

U.S. PATENT DOCUMENTS 10,744,936 B1 * 8/2020 Budhia ...................... B60J 3/04
10,843,535 B1 * 11/2020 Mazuir ............... G02F 1/13725
(Continued)

FOREIGN PATENT DOCUMENTS

| DE | 102015201735 A1 | 8/2016 |
| DE | 102015214052 A1 | 2/2017 |
| WO | 2015062751 A1 | 5/2015 |

OTHER PUBLICATIONS

International Search Report dated Nov. 17, 2020 in related/corresponding International Application No. PCT/EP2020/069931.
(Continued)

Primary Examiner — Todd Melton
(74) Attorney, Agent, or Firm — Patent Portfolio Builders PLLC

(57) ABSTRACT

A device and a method for controlling a shading system of vehicle windows. A camera system detects image data of the head of a driver. The image data is evaluated to determine a gaze direction of the driver either as a function of a current pose of the head or body position of the driver ascertained based on the image data or as a function of eye positions of the driver determined based on image data. The shading system is controlled when the determined current gaze direction is looking in an interior rear view mirror, in the direction of the rear window, in the direction of one of the side windows, a reverse gear of the vehicle is set/activated, and the vehicle is in operation/activated. The control involves suspending or switching off a current shading/darkening of the rear window or of the side window in the gaze direction of the driver.

10 Claims, 2 Drawing Sheets

Figure 1:
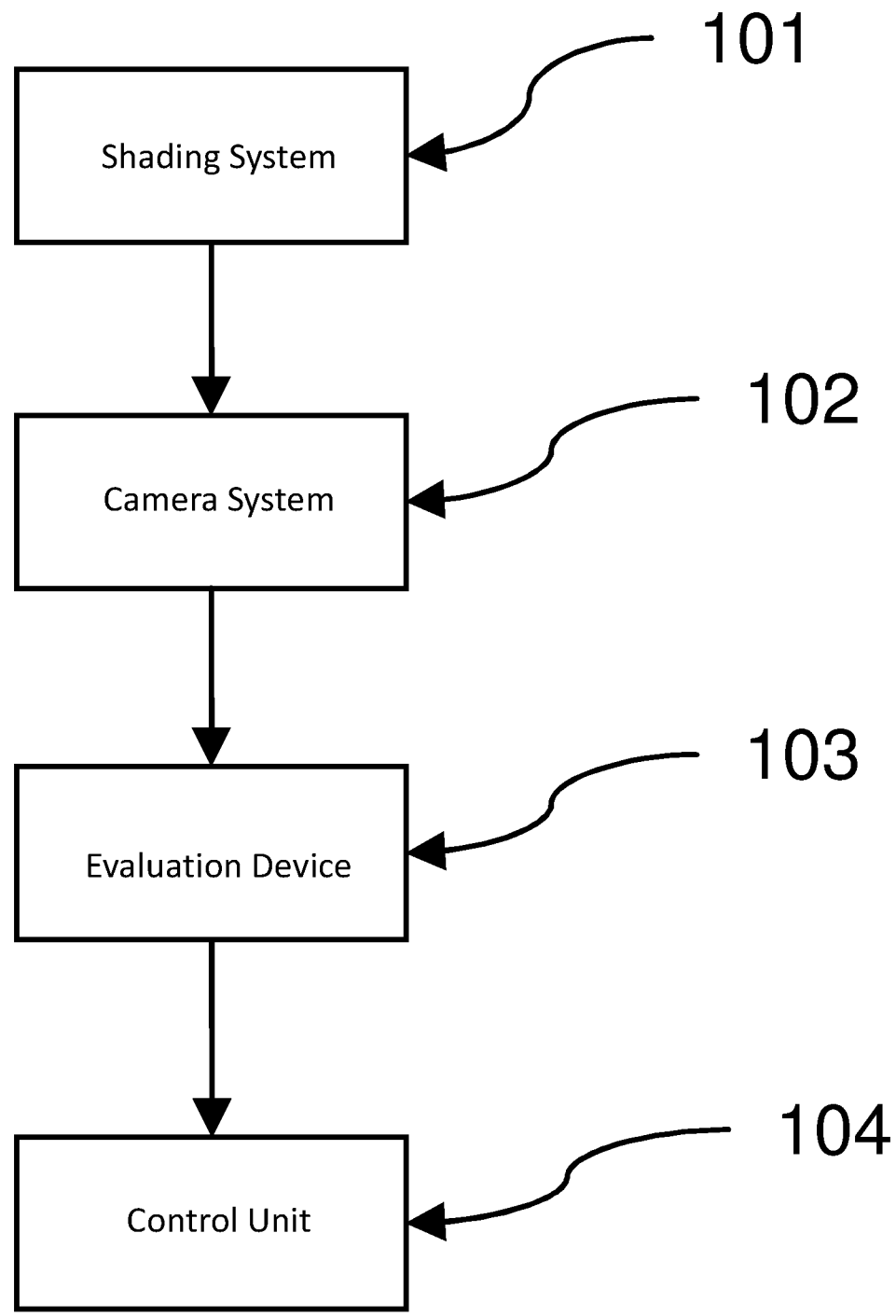

(51) Int. Cl.
    *G06V 20/59*    (2022.01)
    *B60J 1/20*    (2006.01)

(56) References Cited

U.S. PATENT DOCUMENTS

| | | |
|---|---|---|
| 2013/0286177 A1 | 10/2013 | Deleeuw et al. |
| 2018/0012562 A1 | 1/2018 | Mertens et al. |
| 2019/0346701 A1 | 11/2019 | Lam et al. |

OTHER PUBLICATIONS

Office Action dated May 30, 2020 in related/corresponding DE Application No. 10 2019 005 447.4.
Written Opinion dated Nov. 17, 2020 in related/corresponding International Application No. PCT/EP2020/069931.

\* cited by examiner

DEVICE AND METHOD FOR CONTROLLING A SHADING SYSTEM FOR A VEHICLE

BACKGROUND AND SUMMARY OF THE INVENTION

Exemplary embodiments of the invention relate to a device and a method for controlling a shading system for a vehicle, in particular a motor vehicle.

Shading systems for motor vehicles are known from the prior art. Shading systems reduce the penetration of sunlight into the interior chamber of the vehicle and act as an optical barrier largely preventing a view into the interior chamber of the vehicle from the outside. To do so, so-called sun roller blinds/privacy shield blinds are often used on the side windows and on the rear window of a motor vehicle. Such shading systems are usually operated by a vehicle user by means of manual operation (e.g., by actuating a rocker switch).

A method for operating a device for the contactless detection of objects and/or people and gestures carried out by them and/or operating processes in a vehicle interior is known from WO 2015/062751 A1, wherein the detection is carried out by means of an optical detection unit. Here, a three-dimensional gesture is detected, wherein a vehicle function is controlled depending on the gesture detected.

Exemplary embodiments of the invention are directed to a device and a method for a more user-friendly control of a shading system.

A first aspect of the invention relates to a device for controlling a shading system for a vehicle, with which a rear window and/or one or more side windows of the vehicle can be shaded/darkened, comprising: a camera system for detecting image data BD1 from the head and/or body position of a driver of the vehicle, an evaluation device for evaluating the image data BD1, in order to determine a gaze direction BR(t) of the driver, either as a function F1 of a current pose $POSE_K(t)$ of the head and/or body position of the driver determined based on the image data BD1: BR(t) =F1($POSE_K(t)$) and/or as a function F2 of eye positions AP(t) of the driver determined based on the image data BD2: BR(t)=F2(AP(t)), a control unit which is set up and designed to control the shading system under the following conditions:—the ascertained current gaze direction BR(t) of the driver results in looking into an interior rear view mirror of the vehicle or looking in the direction of the rear window or looking in the direction of one of the side windows, —a reverse gear of the vehicle is set/activated, and—the vehicle is in operation/activated, in such a way that a current shading/darkening of the rear window and/or a current shading/darkening of the side windows in the gaze direction BR(t) of the driver is suspended/switched off.

Advantageously, 2D or 3D image data BD1 is detected with the camera system. The camera system advantageously comprises, for example, a video camera, a stereo camera, a TOF camera, a laser scanner, an ultrasound sensor, or a combination of these. Furthermore, the camera system advantageously comprises a light source for illuminating the driver. The light source is advantageously an infrared light source.

The evaluation device is advantageously designed as an image data computing unit having a processor and a corresponding piece of software running on it.

Determining a gaze direction BR(t) based on a current pose $POSE_K(t)$ of the head of the driver determined in the image data B1 or based on eye positions AP(t) of the driver determined based on image data BD1 is known in the prior art, which will be referred to here.

The proposed device thus controls the shading system in such a way that, if a driver wants to drive the vehicle backwards (condition: reverse gear set) and, to do so, they look backwards through the rear window or look backwards to the right or to the left through the corresponding side window or look backwards in the rear view mirror through the rear window, an optionally present shading/darkening of the relevant window is suspended/switched off. Thus, the driver has an unimpeded view in the direction of the rear surroundings of the vehicle, which considerably minimizes the potential of an accident when driving in reverse.

According to an advantageous development of the proposed device, the shading system is only controlled to suspend/switch off a current shading/darkening of the rear window when it is determined in the image data BD1 that the driver, if the vehicle is a left-hand drive vehicle, looks backwards over their right shoulder in the direction of the rear window, or if the vehicle is a right-hand drive vehicle, the driver looks backwards over their left shoulder in the direction of the rear window. This allows a reduction of the calculating effort when evaluating the image data BD1. In particular, the detection of the image data from the head of the driver, for example the head alignment, and the image data of the body position of the driver, for example an upper body turned towards the middle of the vehicle, enables a reliable determination of the gaze direction.

According to an advantageous development of the proposed device, the control unit is designed and set up to retract/fold up currently extended headrests, which are allocated to backseats of the vehicle, if the gaze direction BR(t) is directed in the direction of the rear window or in the direction of the internal rear view mirror. By retracting/folding up the headrests, the visible range of the driver of the rear surroundings is enlarged, which in turn minimizes the potential of an accident when driving in reverse.

According to an advantageous development of the proposed device, the camera system is designed and set up to detect image data BD2 of a seat configuration SB(t) of backseats of the vehicle, the evaluation unit is designed and set up to evaluate the image data BD2, in order to determine the current seat configuration $SB_{PERS}(t)$ by people on the backseats, and the control unit is designed and set up to retract/fold up currently extended headrests, which are allocated to backseats of the vehicle, if the gaze direction BR(t) is directed in the direction of the rear window or in the direction of the internal rear view mirror for seats that are no longer occupied by a person. Thus, it is ensured that passengers on the backseats of the motor vehicle, for whose seats headrests are extended, do not have to endure any comfort losses. As soon as a forward gear is set and/or the vehicle exceeds a predetermined speed threshold in the forward direction, the headrests are extended again. As soon as a person sits back down on the backseat, the headrests are extended corresponding to the height of the person.

Advantageously, the shading system comprises one or more shading/darkening roller blinds driven by an actuator and/or one or more windows with adjustable transmission.

Advantageously, the device comprises a rain sensor which generates a signal when rain is prevalent, wherein the control unit is advantageously designed and set up to activate a windscreen wiper allocated to the rear window when the signal is present. The view through the rear window is improved by the activated windscreen wiper.

According to an advantageous development of the proposed device, the control unit is designed and set up to reproduce/switch on a suspended/switched off shading/darkening when a forward gear is set in the vehicle and/or when the vehicle exceeds a predetermined speed threshold in the forward direction or when an ignition of the vehicle is set to "off" and/or a handbrake of the vehicle is set. The shading/darkening are thus advantageously automatically returned to a comfort-focused state for the user. According to the same conditions as when reproducing the shading/darkening, a previously folded-up or retracted headrest can also be extended again.

According to an advantageous development of the proposed device, the control unit is designed and set up to extend/fold out headrests retracted or folded up corresponding to the seat of the person as soon as a person sits on the backseat corresponding to a detected body size of the person. Along with detecting the head, the camera system is set up to detect the body size, in particular to detect the height of the upper body. Corresponding to the height of the upper body of the person sitting on the seat, a corresponding headrest position can be determined, which is set automatically when recognizing a person.

According to an advantageous development of the proposed device, the control unit is designed and set up to reduce a level of brightness of an interior illumination of the vehicle if the gaze direction BR(t) is directed in the direction of the rear window or in the direction of the interior rear view mirror.

According to an advantageous development of the proposed device, the control unit is designed and set up to increase a reduced level of brightness of the interior illumination back to the original value, when a forward gear is set in the vehicle and/or when the vehicle exceeds a predetermined speed threshold in the forward direction.

According to an advantageous development of the proposed device, the control unit is designed and set up to increase a reduced level of brightness of the interior illumination back to the original value when an ignition of the vehicle is set to "off" and/or a handbrake of the vehicle is set.

A second aspect of the invention relates to a vehicle, in particular a motor vehicle having a device as described above.

A third aspect of the invention relates to a method for controlling a shading system for a vehicle, with which a rear window and/or one or more side windows of the vehicle can be shaded/darkened. The method comprises the following steps. In one step, a detection of image data BD1 of the head and/or a body position of a driver of the vehicle is carried out with a camera system. In a further step, an evaluation of the image data BD1 is carried out with an evaluation device in order to determine a gaze direction BR(t) of the driver, either as a function F of a current pose $POSE_K(t)$ of the head and/or the body position of the driver determined based on the image data BD1: $BR(t)=F(POSE_K(t))$ and/or as a function F2 of eye positions AP(t) of the driver ascertained based on image data BD1: $BR(t)=F2(AP(t))$. In a further step, a control of the shading system is carried out with a control unit under the following conditions:
- the determined current gaze direction BR(t) of the driver results in a look in an internal rear view mirror of the vehicle or a look in the direction of the rear window or a look in the direction of one of the side windows, —a reverse gear of the vehicle is set/activated, and
- the vehicle is in operation/activated, in such a way that a current shading/darkening of the rear window and/or a current shading/darkening of the side window in in gaze direction BR(t) of the driver is suspended/switched off.

According to an advantageous development of the proposed method, the shading system is only controlled to suspend/switch off a current shading/darkening of the rear window when it is determined in the image data BD1 that the driver, if the vehicle is a left-hand drive vehicle, looks backwards over their right shoulder in the direction of the rear window or, if the vehicle is a right-hand drive vehicle, the driver looks backwards over their left shoulder in the direction of the rear window.

According to an advantageous development of the proposed method, if the gaze direction BR(t) is directed in the direction of the rear window or in the direction of the internal rear view mirror, the control unit retracts/folds up/back currently extended headrests, which are allocated to backseats of the vehicle.

According to an advantageous development of the proposed method, the camera system detects image data BD2 of a seat configuration SB(t) of backseats of the vehicle, the evaluation device evaluates the image data BD2 in order to determine the current seat configuration $SB_{PERS}(t)$ of people on the backseats, and if the gaze direction BR(t) is directed in the direction of the rear window or in the direction of the interior rear view mirror, the control unit retracts/folds up currently extended/folded out headrests, which are allocated to backseats of the vehicle, for the backseats which are no longer occupied by a person.

According to an advantageous development of the method, a rain sensor is present which generates a signal in the event of rain, and the control unit activates a windscreen wiper allocated to the rear window if this signal is present.

According to an advantageous development of the method, the control unit reproduces/switches on a suspended/switched-off shading/darkening when a forward gear is set in the vehicle and/or when the vehicle exceeds a predetermined speed threshold in the forward direction.

According to an advantageous development of the method, the control unit reproduces/switches on a suspended/switched-off shading/darkening when an ignition of the vehicle is set to "off" and/or a handbrake of the vehicle is set.

According to an advantageous development of the method, if the gaze direction BR(t) is directed in the direction of the rear window or in the direction of the internal rear view mirror, the control unit reduces a brightness level of an internal illumination of the vehicle.

According to an advantageous development of the method, the control unit increases a reduced brightness level of the internal illumination back to the original value when a forward gear is set in the vehicle and/or when the vehicle exceeds a predetermined speed threshold in the forward direction.

According to an advantageous development of the method, the control unit increases a reduced brightness of the interior illumination back to the original value when an ignition of the vehicle is set to "off" and/or a handbrake of the vehicle is set.

Further advantages, features and details emerge from the description below in which—optionally with reference to the drawings—at least one exemplary embodiment is described in detail. The same, similar and/or functionally identical parts are provided with the same reference numerals.

BRIEF DESCRIPTION OF THE DRAWING FIGURES

Here are shown:

FIG. 1 a highly schematized construction of a proposed device, and

Figure 2:
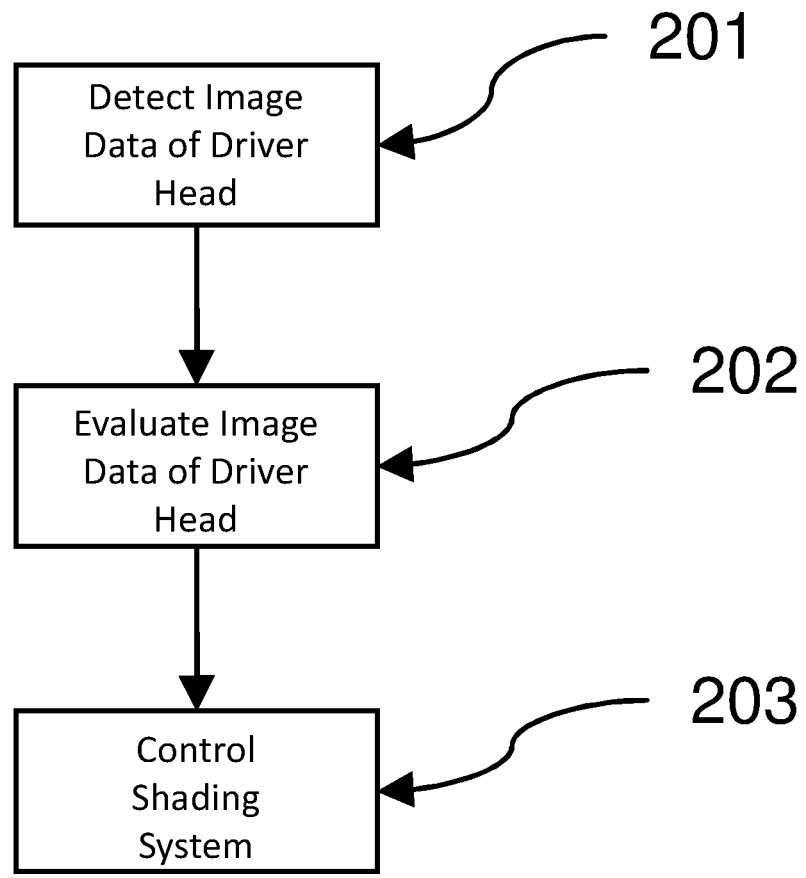

FIG. 2 a highly schematized flowchart of a proposed method.

DETAILED DESCRIPTION

FIG. 1 shows a highly schematized construction of a proposed device for controlling a shading system 101 for a motor vehicle, with which a rear window of the motor vehicle can be shaded/darkened, comprising: a camera system 102 for detecting image data BD1 of the head and body position of a driver of the motor vehicle and an evaluation device 103 for evaluating the image data BD1, in order to determine a gaze direction BR(t) of the driver, as a function F of a current pose $POSE_K(t)$ of the head and/or body position of the driver determined based on the image data BD1: $BR(t)=F(POSE_K(t))$.

Furthermore, the device comprises a control unit 104 which is set up and designed under the following conditions:
the determined current gaze direction BR(t) of the driver results in looking in an internal rear view mirror of the motor vehicle or looking the direction of the rear window,
a reverse gear of the motor vehicle is set/activated, and
the motor vehicle is in operation/activated,
to control the shading system 101 in such a way that a current shading/darkening of the rear window is suspended/switched off.

The shading system 101 can be on the rear window as a rear roller blind, as a rear window with variably adjustable transmission, as a rear window with intelligent glass (S BD glass) or as an intelligent display device ("Smart Window") in which the rear window is designed as a transparently switchable display.

FIG. 2 shows a highly schematized flowchart of a proposed method for controlling a shading system 101 for a motor vehicle, with which a rear window of the motor vehicle can be shaded/darkened, comprising the following steps.

In a step 201, image data BD1 of the head of a driver of the motor vehicle is detected with a camera system 102.

In a step 202, the image data BD1 is evaluated by an evaluation device 103 in order to determine a gaze direction BR(t) of the driver as a function F of a current pose $POSE_K(t)$ of the head of the driver ascertained based on the image data BD1: $BR(t)=F(POSE_K(t))$.

In a step 203, a control unit 104 controls the shading system 101 under the following conditions:
the determined current gaze direction BR(t) of the driver results in looking into an interior rear view mirror of the vehicle or looking in the direction of the rear window,
a reverse gear of the vehicle is set/activated, and
the vehicle is in operation/activated,
in such a way that a current shading/darkening of the rear window is suspended/switched off.

Although the invention has been illustrated and explained in more detail by preferred exemplary embodiments, the invention is not limited by the disclosed examples, and other variations can be derived from this by the person skilled in the art without leaving the protected scope of the invention. It is thus clear that there is a plurality of variation possibilities. It is also clear that embodiments mentioned by way of example really only constitute examples which are in no way to be understood as limiting the scope of protection, for example, the usage possibilities or the configuration of the invention. Instead, the previous description and the description of the drawings puts the person skilled in the art in position of concretely implementing the exemplary embodiments, wherein the person skilled in the art, with an understanding of the disclosed inventive concept, can undertake various amendments, for example in terms of the function or the arrangement of elements mentioned in an exemplary embodiment, without leaving the scope of protection, which is defined by the claims and their legal equivalents, such as further explanations in the description.

The invention claimed is:

1. A system for a vehicle having a rear window or one or more side windows, the system comprising:
a shading system configured to shade or darken the rear window or the one or more side windows;
a camera system configured to detect image data of a head or body position of a driver of the vehicle;
an evaluation device configured to evaluate the detected image data to determine a gaze direction of the driver, wherein the gaze direction of the driver is determined either as a function of
a current pose of the head or body position of the driver determined based on the detected image data, or
eye positions of the driver determined based on the detected image data; and
a control unit configured to control the shading system responsive to the following conditions being satisfied
the determined current gaze direction of the driver is the driver looking in an interior rear view mirror of the vehicle or the driver looking in a direction of the rear window or one of the one or more side windows,
a reverse gear of the vehicle is set or activated, and
the vehicle is in operation or activated,
wherein the control unit is configured to control the shading system, responsive to the conditions being satisfied, by suspending or switching off a current shading or darkening of the rear window or a current shading or darkening of a side window of the one or more side windows that is in the determined gaze direction of the driver.

2. The system of claim 1, wherein the control unit is configured to retract or fold up currently extended headrests allocated to backseats of the vehicle when the determined gaze direction is directed in the direction of the rear window or in the direction of the interior rear view mirror.

3. The system of claim 2, wherein the control unit is configured to re-extend or fold out retracted or folded-up headrests belonging to the seat of the person corresponding to a detected body size of the person as soon as a person sits on the backseat.

4. The system of claim 1, wherein
the camera system is configured to detect image data of a seat configuration of backseats of the vehicle,
the evaluation device is configured to evaluate the image data the seat configuration of the backseats of the vehicle to determine a current seating configuration by people on the backseats, and
the control unit is configured to retract or fold up currently extended headrests allocated to backseats of the backseats of the vehicle that are not occupied by a person when the determined gaze direction is directed in the direction of the rear window or in the direction of the interior rear view mirror.

5. The system of claim 1, wherein the control unit is configured to reproduce or switch on a suspended or switched off shading or darkening of the rear window or one of the one or more side windows when
- a forward gear is set in the vehicle,
- the vehicle exceeds a predetermined speed threshold in a forward direction, or
- an ignition of the vehicle is set to off or a handbrake of the vehicle is set.

6. The system of claim 1, wherein the control unit is configured to reduce a brightness of an interior illumination of the vehicle when the detected gaze direction is directed in the direction of the rear window or in the direction of the interior rear view mirror.

7. The system of claim 6, wherein the control unit is configured to increase a reduced brightness of the interior illumination back to an original value when a forward gear is set in the vehicle or when the vehicle exceeds a predetermined speed threshold in a forward direction.

8. The system of claim 6, wherein the control unit is configured to increase a reduced brightness of the interior illumination back to an original value when an ignition of the vehicle is set to off or a handbrake of the vehicle is set.

9. A vehicle, comprising:
- a rear window;
- one or more side windows;
- a shading system configured to shade or darken the rear window or the one or more side windows;
- a camera system configured to detect image data of a head or body position of a driver of the vehicle;
- an evaluation device configured to evaluate the detected image data to determine a gaze direction of the driver, wherein the gaze direction of the driver is determined either as a function of
  - a current pose of the head or body position of the driver determined based on the detected image data, or
  - eye positions of the driver determined based on the detected image data; and
- a control unit configured to control the shading system responsive to the following conditions being satisfied
  - the determined current gaze direction of the driver is the driver looking in an interior rear view mirror of the vehicle or the driver looking in a direction of the rear window or one of the one or more side windows,
  - a reverse gear of the vehicle is set or activated, and
  - the vehicle is in operation or activated,
- wherein the control unit is configured to control the shading system, responsive to the conditions being satisfied, by suspending or switching off a current shading or darkening of the rear window or a current shading or darkening of a side window of the one or more side windows that is in the determined gaze direction of the driver.

10. A method for controlling a shading system for a vehicle that shades or darkens a rear window or one or more side windows of the vehicle, the method comprising:
- detecting, by a camera system of the vehicle, image data of a head or body position of a driver of the vehicle;
- evaluating, by an evaluation device, the detected image data in order to determine a gaze direction of the driver as a function of
  - a current pose of the head or body position of the driver based on the detected image data, or
  - eye positions of the driver determined based on the detected image data;
- controlling, by a control unit, the shading system responsive to the following conditions being satisfied
  - the determined current gaze direction of the driver is the driver looking in an interior rear view mirror of the vehicle or the driver looking in a direction of the rear window or one of the one or more side windows,
  - a reverse gear of the vehicle is set or activated, and
  - the vehicle is in operation or activated,
- wherein the control of the shading system responsive to the conditions being satisfied involves suspending or switching off a current shading or darkening of the rear window or a current shading or darkening of a side window of the one or more side windows that is in the determined gaze direction of the driver.

* * * * *